Jan. 6, 1953          N. C. WILLIAMS          2,624,320

PRESSURE FLUID MOTOR WITH MOVEMENT LIMIT VALVE THEREFOR

Filed Dec. 10, 1949

*INVENTOR.*
NORMAN C. WILLIAMS

BY *G. F. McDougall*

*Attorney*

Patented Jan. 6, 1953

2,624,320

UNITED STATES PATENT OFFICE 2,624,320

PRESSURE FLUID MOTOR WITH MOVEMENT LIMIT VALVE THEREFOR

Norman C. Williams, Portland, Oreg., assignor to Power Brake Equipment Co., Portland, Oreg., a company Application December 10, 1949, Serial No. 132,251

9 Claims. (Cl. 121—46)

The invention described and explained hereinafter, is of a limit valve in conjunction with remote control valve and pressure gauge for a fluid pressure load weighing device. Such weighing devices have been proposed in considerable number and are an economic necessity where logs are hauled over paved state highways on heavy trucks and trailers.

Since such a truck or trailer seldom or never stands level where loaded, and where the load must be checked to be near to but not over the legal load for the vehicle, there will be two or four load lifters under the bunks upon which the load is carried and fluid pressure to operate an expansible chamber device, one or more disposed under each end of the load and the total weight of the load is ascertained by pressure gauges in communication with each expansible chamber.

Such devices present the problem of applying just enough lift to each lifting device and no more, for reasons which will be seen at once, the work to be done by at best semi-skilled workmen.

It is the object of the present invention to furnish a simple, rugged and reliable article at low cost.

Other objects will be apparent to operatives familiar with the operation of logging trucks and other heavy duty highway transport, from the following description and are particularly pointed out in the claims herewith.

A drawing accompanies and forms a part of this disclosure, in which—

Figure 1:
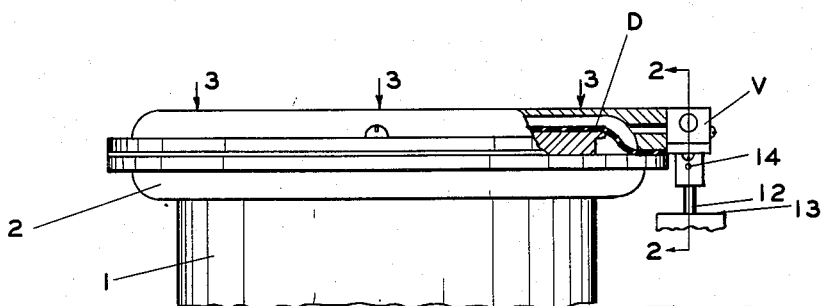
Fig. 1 is an outline sketch of an expansible chamber device, which is not claimed as novel, saving and excepting that it shows a limit valve, which is believed to be novel.

Explaining the drawing in greater detail: Numeral 1, Fig. 1, represents a relatively fixed ram and numeral 2 represents an expansible chamber, mounted for vertical reciprocating motion, of small magnitude on top of the ram 1. There will be a diaphragm seal D between the ram and the chamber, the load being represented by the arrows 3; and it will be seen that it is the chamber structure that lifts the load by expanding away from the inside end of the ram, in this case, but any suitable expansible chamber device can be substituted for the one schematically indicated in Fig. 1.

The ram of the type shown will be operable by compressed air, as nearly all of the trucks that might employ it have reliable air brake equipment and an engine driven compressor. A compressed air line operated by controls will supply air to the expansible chamber through port 16 of the limit valve 7 when a load is to be weighed, but is not shown in the drawing.

The chamber 9 as shown is provided with inner threaded ports 9' and 9", either of which (we will choose 9') will be connected to a source of air pressure mentioned but not shown as it is entirely conventional and the remaining port 9" is for the purpose of connecting a pressure gauge for reading the total load lifted in terms of weight instead of pounds per sq. in.

At the right hand side of Fig. 1 is shown an outlined drawing of the limit valve of the invention and a rigid support 13 for the movable rod valve 12.

The limit valve, designated in Fig. 1 by the letter V, which indicates the valve as a whole, comprises a body 7, having a dependent tube 8, and provided with an inner fluid pressure chamber, within the body 7 and indicated by numeral 9, the said inner chamber being in open communication with the interior of the expansible chamber 2, and having the same air or fluid pressure within, at all times.

The dependent tube 8 is smoothly bored as shown at 10, has incorporated with its median inner length a suitable packing 11, and contains a polished metal rod valve 12 that is prevented from blowing out by internal air or fluid pressure by the support 13. The said support 13 will be firmly supported in turn by a load carrying part of the vehicle with which the load weighing device is associated.

Immediately below the sealing packing 11, is a vent 14, for escaping air or fluid and it will be seen that when the expansible chamber device 2 lifts the load 3, the rod valve 12 will not follow but when the load is suitably and correctly elevated it will not rise any further because the rod valve 12, has passed out of packing 11, permitting air or fluid pressure to escape through vent 14.

The escape of air or fluid pressure is indicated to the operator when the pressure in the gauge ceases to climb. When the supply of pressure is shut off and a control valve moved to a hold position, the expansible chamber will settle slightly, causing rod valve 12 to be resealed in packing 11.

The static pressure created by the load resting upon this expansible chamber 2 and the sealed limit valve assembly is readable on the pressure gauge directly in weight units, giving a non-varying indication of the weight of the load.

When a master control valve is moved to release position, the fluid pressure supporting the load is permitted to exhaust and the chamber retracts to rest position.

Figure 2:
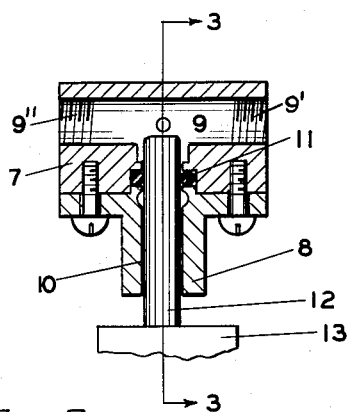
Fig. 2 is an enlarged view of the limit valve, shown small and not detailed in Fig. 1, being a section taken on the plane 2—2 of Fig. 1.
Figure 3:
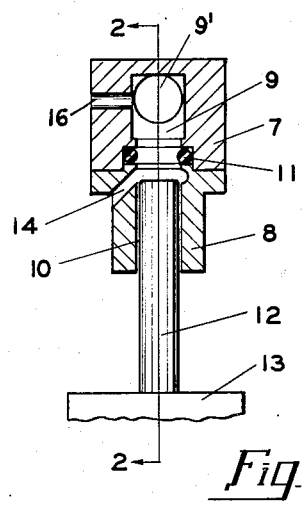
Fig. 3 is a section taken on the plane 3—3, Fig. 2.

Fig. 2 shows the rod valve 12, in its normal position, when there is no air pressure within the expansible chamber sufficient to lift the load and Fig. 3 shows the rod valve partially withdrawn from the tube 8 so that excess air or fluid can escape through the vent 14.

No pressure gauges or control valves are shown as they will often be inside the cab of the truck.

Having fully explained my limit valve so that those familiar with the art concerned will be able to understand its principle of operation and construct it, what I claim as new and desire to secure by Letters Patent, is:

1. A limit valve for limiting the lift of a fluid pressure expansible two part chamber lifting device comprising, a fixed part, a movable part, a valve body, said valve body connected to said movable part, an inner fluid pressure chamber in said movable part, air pressure supply means for said expansible chamber, a pressure supply port, a tubular portion depending from said valve body provided with a bore, the inner end of which is in communication with said fluid pressure chamber, a movable rod valve mounted within said bore and sensitive to pressure therein, an abutting support for the outer end of said valve against the fixed part and a vent in the median portion of the bore that will be uncovered by the rod valve when the valve body has been lifted a predetermined amount.

2. A fixed and movable part expansible chamber fluid pressure lifting device, having in combination therewith a limit valve made rigid with an overhanging part of said movable part, said limit valve comprising a body, a fluid pressure chamber within said body in communication with the said expansible chamber, a pressure supply port therefor, a bore provided in said body parallel with the path of motion of said movable part, a rod valve in said bore made movably fluid tight therein, an abutting support for the outer end of said rod valve against said fixed part to prevent its blowing out under pressure and a lateral vent in median position for said bore that will be uncovered by said rod valve to vent the chamber of the lifting device when predetermined lift is reached.

3. The combination as claimed in claim 2 and including a packing device for the rod valve that is effective to permit withdrawal of said rod valve, to waste excess fluid and subsequent reentrance thereof to trap a relatively fixed volume within the said lifting device upon shutting off of fluid supply therefrom.

4. A limit valve for a vertical moving lifting device, comprising a fixed ram member, a movable superposed lifter member responsive to fluid pressure, a diaphragm seal therebetween, comprising a valve body mounted externally on and movable equally with said movable member, said valve body provided with an inner fluid chamber in communication with said expansible chamber, a pressure supply port therefor, a free moving rod valve having one end within said inner fluid chamber and the opposite end supported by abutting contact equally with said fixed member, a tube, within which said rod valve is slidable and a lateral vent for said tube that is made operative by movement of said tube to fix the limit of rise of said movable member.

5. A limit valve for a fixed and movable part fluid pressure lifting device that lifts by the expansion of an expansible chamber, comprising an external valve body made rigid with the expansible chamber to lift upon expansion thereof, a pressure supply port therefor, a tube portion dependent from said valve body, a rod valve movable in said tube and that normally seals the same, the said rod valve in said tube supported by abutting contact with the fixed part in sealing position and a limit port effective to vent the expansible chamber uncovered by the rod valve upon maximum determined lift being reached.

6. A fluid pressure load lifting and weighing device of the expansible chamber type comprising fixed and movable parts, having in combination therewith a lift limiting device comprising a valve body provided with an inner chamber, said inner chamber in open communication with the expansible chamber, a common pressure supply port therefor, said valve body having a bore, a rod valve slidable in said bore, said bore provided with a vent in its median portion normally sealed by said rod valve, said rod valve supported externally of said valve body by a contact support means to progressively withdraw from said bore as said valve body rises to finally uncover said vent.

7. A fluid pressure load lifting device for transport trucks of the fixed and movable part, fluid pressure expansible chamber type, enclosing a chamber therebetween, having in combination therewith, a lift limit device comprising a valve body provided with an inner chamber in open communication with the said expansible chamber, said valve body movable with said movable part, a pressure supply port therefor, a dependent tube portion of said valve body, a rod valve movably supported in said tube in tube sealing normal position, said tube provided with a vent, said rod valve externally supported by the fixed part and movable outwardly by fluid pressure as the chamber expands to finally uncover said vent to limit the lift.

8. A fluid pressure load lifting device for load carrying vehicles comprising an expansible chamber lifting apparatus, relatively fixed and movable portions of said apparatus, a valve body made rigid in lateral relation with said movable portion with its interior in open communication with the interior of said expansible chamber apparatus, a pressure supply port in communication with said valve body, said valve body formed with a dependent tube portion, said tube portion being provided with a lateral outlet, a rod valve slidably mounted within said tube portion with its outer end supported to normally close the said tube, effective to uncover said lateral outlet upon rise of said movable portion, to limit the amount of rise thereof.

9. A pneumatic load lifting device of the ram and expansible chamber type wherein the ram is relatively fixed with the chamber movable, having in combination therewith a lift limiting device comprising a valve chamber laterally attached to said chamber, a common air supply port for said chambers, a dependent rod valve tube in communication with said valve chamber, a rod valve therein that extends beyond the end of said tube, a normally closed outlet provided in the median length of said tube, and a support for the outer end of said rod valve to support the same partly within the tube to uncover said outlet upon raising of said expansible chamber to a predetermined height.

NORMAN C. WILLIAMS.

REFERENCES CITED

The following references are of record in the file of this patent:

UNITED STATES PATENTS

| Number | Name | Date |
|---|---|---|
| 1,150,743 | Butts | Aug. 17, 1915 |
| 1,904,345 | Anthony et al. | Apr. 18, 1933 |
| 2,044,777 | Erling | June 23, 1936 |
| 2,323,021 | Ernst | June 29, 1943 |
| 2,360,733 | Smith | Oct. 17, 1944 |
| 2,411,930 | Mathys | Dec. 3, 1946 |
| 2,452,124 | Huston et al. | Oct. 26, 1948 |
| 2,482,027 | Poole | Sept. 13, 1949 |
| 2,543,109 | Holowka | Feb. 27, 1951 |

FOREIGN PATENTS

| Number | Country | Date |
|---|---|---|
| 88,803 | Sweden | Mar. 16, 1937 |